July 12, 1949.　　　G. D. EVERINGTON　　　2,476,030
FLUID TRANSMISSION RELAY DEVICE
Filed March 1, 1944　　　　　　　　　　2 Sheets-Sheet 1
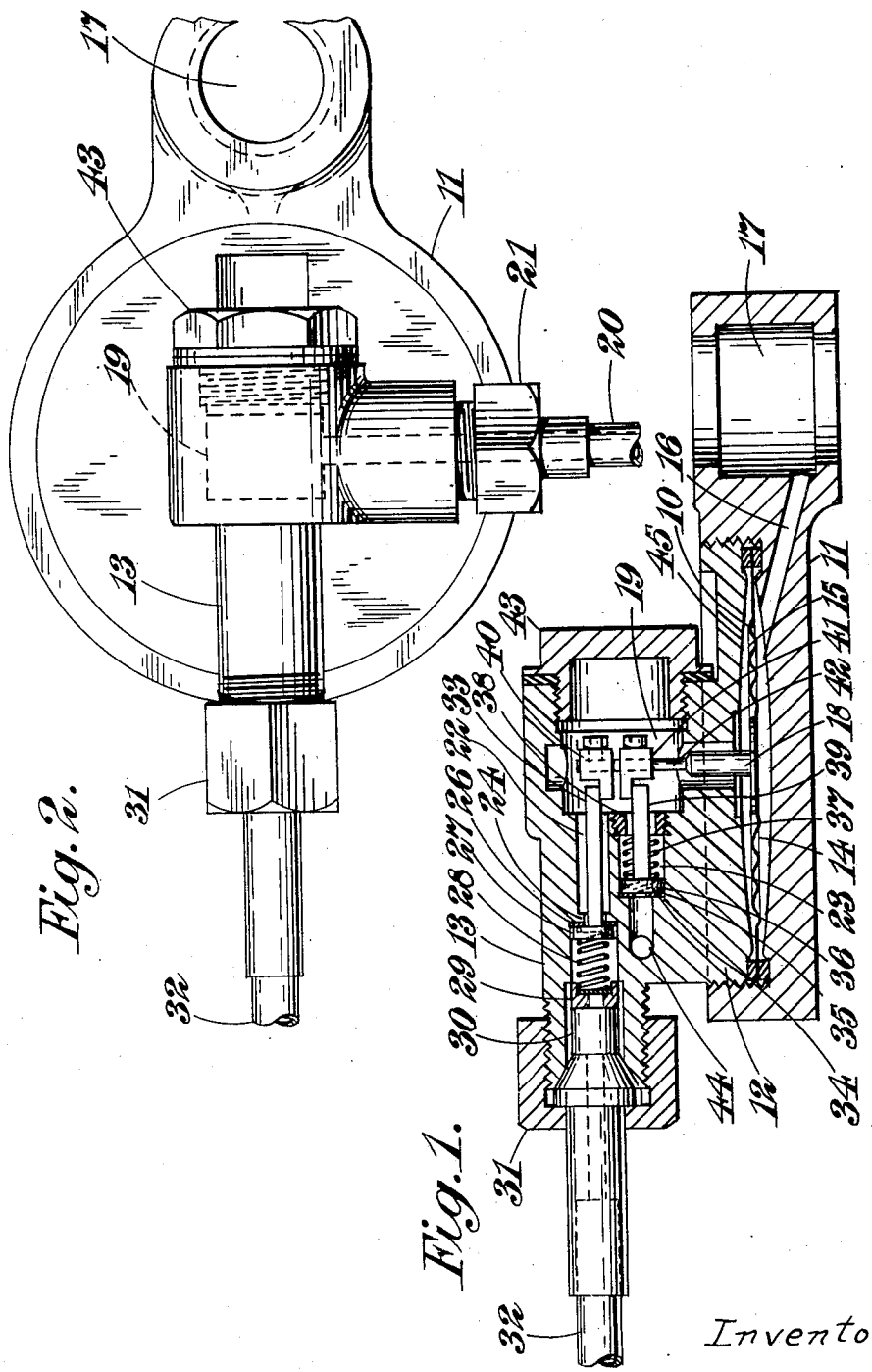
Inventor,
Geoffrey D. Everington
By Young, Emery & Thompson
Attys.

July 12, 1949.  G. D. EVERINGTON  2,476,030
FLUID TRANSMISSION RELAY DEVICE
Filed March 1, 1944  2 Sheets-Sheet 2
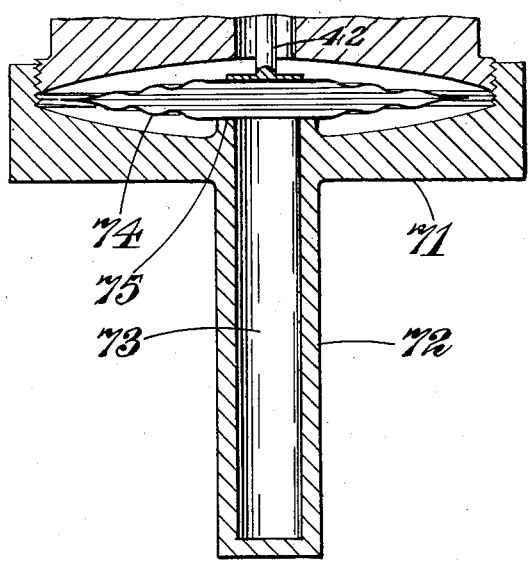
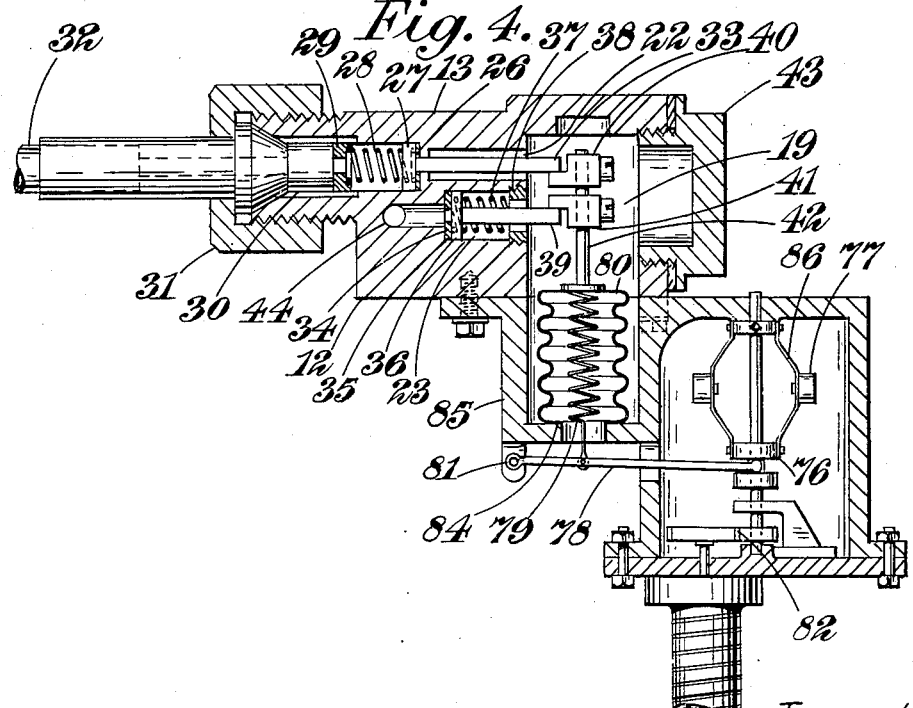
Inventor,
Geoffrey D. Everington
By Young, Emery & Thompson
Attys.

Patented July 12, 1949

2,476,030

UNITED STATES PATENT OFFICE 2,476,030

FLUID TRANSMISSION RELAY DEVICE

Geoffrey Devas Everington, London, England, assignor to K. D. G. Instruments Limited, London, England, a British company Application March 1, 1944, Serial No. 524,647
In Great Britain February 8, 1943

1 Claim. (Cl. 137—144)

This invention relates to fluid transmissions for indicating or recording instruments which are disposed at some distance from the source of control which operates them, and is particularly concerned with transmissions for indicating instruments on aircraft, such as oil pressure gauges. An object of the invention is to provide a fluid transmission which can be separated from the indicating instrument and source of control without upsetting the calibration of the instrument.

According to this invention, a fluid transmission for an indicating or recording instrument remotely placed from a source of control comprises a fluid pressure relay influenced by changes in conditions in said source of control, and a conduit for connecting the relay to the indicating and/or recording instrument, which relay comprises valve means for connecting said conduit to either of two sources of pressure of different values, a condition responsive element for operating said valve means, means for applying to said condition responsive element opposed forces, one of which is proportional to the condition in said source of control, and the other proportional to the pressure in said conduit, which condition responsive element is so connected to the valve means that any out-of-balance force opens communication between the conduit and the appropriate source of pressure so as to bring said forces into balance. It will be appreciated with this arrangement that the pressure in the conduit will always be maintained proportional to the force applied to the condition responsive element, and this is communicated to the indicating or recording instrument through said conduit.

The relay may comprise a control chamber having two ports controlled by said valve means, and the condition responsive element may be so associated with the control chamber that one face of the element is subjected to the pressure in the chamber, whereas the other and opposite face is subjected to a force applied to it by the source of control. The source of control may be arranged to apply force to the condition responsive element through fluid means or a spring. For example, the condition responsive element may comprise a flexible diaphragm or capsule, one side of which is arranged to be subjected to fluid pressure in the aforesaid conduit or control chamber, and the other to the pressure applied through the fluid means or spring.

In one form of construction, one of the ports in the control chamber may communicate with atmosphere, and the other with a source of pressure, either above or below atmospheric pressure, according to the direction of the force applied to the condition responsive element by said source of control.

In an alternative arrangement, one of said ports in the control chamber may communicate with a source of suction and the other with atmosphere or with a source of pressure above atmosphere.

A differential valve mechanism may be provided for controlling the aforesaid two ports so that said ports are both closed when the condition responsive element is in a datum position and so that one or other of the ports is open when said condition responsive element moves to one side or other of said datum position.

The aforesaid differential valve mechanism may comprise two valve members having parts thereof spaced apart to provide a gap, and the condition responsive element may be provided with an abutment arranged in the gap and movable in such a manner that one or other of the valve members is moved, according to the direction of movement of the abutment.

The two valve members may be so mounted on their seats and so formed as to be opened when tilted about an axis parallel to the plane of the seat.

Alternatively, the two valve members are arranged to co-operate with valve seats formed on the outer faces of two opposite walls of the control chamber, or of a chamber communicating therewith, and the aforesaid abutment is arranged within the chamber and provided with parts which project through the valve ports so as to engage the valve members.

In the case where the source of control is arranged to generate a fluid pressure which varies from a negative value to a positive value, and in which the two sources of pressure controlled by said valve means are both above atmospheric pressure, or one is above and the other is at atmospheric pressure, resilient biasing means may be associated with the responsive element, so that it is in a neutral or datum position when the source of control is providing the maximum sub-atmospheric pressure.

The following is a description of a number of embodiments of the invention, reference being made to the accompanying drawings, in which:

Figure 1 is a section through a relay device suitable for use with an oil pressure indicating system;

Figure 2 is a plan view of the arrangement shown in Figure 1;

Figure 3 is a diagrammatic section through part of a relay suitable for use with temperature responsive means;

Figure 4 is a diagrammatic view of a relay arrangement suitable for use with a centrifugally operated speed responsive mechanism.

Referring to the arrangement shown in Figures 1 and 2, a resilient diaphragm 10 is clamped between a banjo-shaped casing part 11 and the base 12 of a valve casing 13 so as to provide two separated spaces 14 and 15. The space 14 communicates through a passage 16 with a conduit 17 for connection with the oil pressure system. The space 15 communicates through a passage 18 with a control chamber 19. The control chamber is in direct communication with a conduit 20 (see Figure 2) leading to the recording or indicating apparatus. The conduit 20 is connected with the valve chamber through a suitable union 21. The control chamber is also provided with two valve-controlled passages 22 and 23. The former passage is provided with an inwardly-directed shoulder 24, the outer face of which is provided with a rubber valve seating 26. A mushroom valve 27 is arranged to engage this valve seating, and is pressed towards it by a compression spring 28 which bears at its opposite end on a ported plug 29 threaded in the outlet end 30 of the passage. A union 31 connects this passage through a conduit 32 with a source of compressed air. The poppet valve is provided with a stem 33 which projects into the control chamber 19. The other valve-controlled passage 23 is provided with a shoulder 34 which supports a rubber valve seating 35 on that face thereof directed towards the control chamber. The head 36 of another mushroom valve is pressed towards this seating by a compression spring 37 which engages at its other end with a ported plug 38 threaded into the extremity of the valve passage adjacent the control chamber. This latter mushroom valve is also provided with a stem 39 disposed parallel with the stem 33 and projecting into the valve chamber. The two valve stems are spaced apart to provide a gap in which are located laterally projecting portions of two abutments 40 and 41 axially adjustable on a spindle 42 carried by the flexible diaphragm. A threaded plug 43 closes an opening in the valve casing through which the abutments can be adjusted. The outer end of the valve-controlled passage 23 communicates with the atmosphere through a port 44. There is sufficient clearance between the stem 33 and the inwardly-directed shoulder 24 and between the stem 39 and the ported plug 38 to permit the valve heads to tilt on their seating. Thus, when the diaphragm moves upwardly, the abutment 40 causes the valve head 27 to tilt on its seating, whereas when the diaphragm moves downwards, the valve head 36 is tilted. The abutments are so initially adjusted that when the diaphragm is in a neutral position, corresponding to "no oil pressure," both valves are maintained closed by their respective springs. Should, however, the oil pressure increase and the flexible diaphragm tend to rise, the valve head 27 tilts and the pressure in the control chamber is increased by the source of compressed air until the pressure above the diaphragm is equal to the oil pressure below the diaphragm, thereby returning the diaphragm to its neutral position and allowing the valve 27 to close. If the pressure in the control chamber is in excess of the oil pressure, the diaphragm drops and the pressure is exhausted into the atmosphere through the valve-controlled port 44 until the pressure again balances. The roof of the base part 12 is slightly dished at 45 so that even if leakage takes place to atmosphere from the control compartment 19 when the oil is under pressure, the diaphragm will be supported by this roof and not ruptured.

If the apparatus is required for recording sub-atmospheric pressures, the valve-controlled passage 23 may be arranged to communicate with a source of suction instead of atmosphere; thus, should the diaphragm be drawn downwardly, the valve 36 will be opened and the pressure in the control chamber lowered until the pressures on the two sides of the diaphragm are balanced. The valve-controlled passage 22 may either still communicate with a source of pressure or may communicate with atmosphere. Alternatively, where the responsive element is subjected to pressures ranging from a maximum negative pressure to positive pressures, the arrangement first described above may be modified by loading that face of the diaphragm influenced by the control pressures with a compression spring which exerts a pressure equal but opposite in sense to that of the maximum negative pressure. In this case, the scale of the indicator is displaced so that the pressure indicated is equal to the transmission pressure minus the pressure due to the compression spring.

Figure 3 shows the lower part of a relay embodying temperature-responsive means and arranged to operate valve mechanism similar to that described with reference to Figures 1 and 2. In this construction, the banjo casing part 11 is replaced by cup-shaped part 71, having a thermometer bulb extension 72. The space 73 within the thermometer bulb communicates with the interior of a flexible capsule 74, the capsule being hermetically sealed within the thermometer bulb. The space within these two parts is filled in known manner with a gas such as nitrogen. The lower part of the capsule is sweated at 75 to a seating formed on the bottom surface of the cup-shaped member 71.

Apart from the above-described details, the construction is identical to that shown in Figure 1, the upper part of the capsule being connected through the stem 42 to the valve operating abutments.

Figure 4 shows the invention applied to a speed indicator of the centrifugal type. In this construction, axial movement of a sleeve 76 under the centrifugal action of the weights 77 imparts pivotal movement to a lever arm 78 pivoted at 81 and connected by a comparatively light compression spring 79 to the upper end of a resilient bellows 80. The governor is rotated in conventional manner indicated diagrammatically by gearing 82 and operating cable 83. The lower end of the bellows 80 is hermetically sealed by soldering at 84 to the bottom of the casing 85 which is secured to a valve casing 12 similar to that described with reference to Figure 1. The upper end of the bellows is connected by a stem 42 to valve-operating abutments 40 and 41, also as described with reference to Figure 1. With this arrangement, should the speed of the cable 83 increase, the sleeve 76 moves upwardly, imparting a force through the spring 79 to the bellows 80, whereby the abutment 40 opens the valve for communication with a compressed air supply. The pressure on the bellows is thus increased, tending to collapse it, and in effect increasing the stiffness of the governor springs 86 by reason of the force transmitted through the spring 79 and the lever arm 78. The pressure built up in the valve casing will be proportional to the rate of rotation of the governor and this pressure will be communicated to the indicating instrument. Should the speed be reduced, there will be a tendency for the bellows to be collapsed and the valve casing to be put in communication with the atmosphere, until the pressure in the casing balances the pressure imparted by the governor to the bellows.

It will be appreciated that the relay system described above may have many other applications. For example, it may be used for indicating disposition of parts, such as the angular position of flaps and other control surfaces in aircraft, in which case the flap may be connected directly to an arm, such as the arm 78 in Figure 6, in place of the governor. The movement of the flap is converted by the spring 79 to a force proportional to the extent of movement of the flap.

In any of the above arrangements where one and the same diaphragm is subjected to opposed pressures, it will be necessary for the external source of fluid pressure to be equal to or greater than the maximum pressure to be indicated.

I claim:

A fluid pressure relay comprising a casing having a compartment with three ports therein two of which are provided with valve seats for communicating with two different sources of fluid pressure and the third of which is adapted to communicate with a conduit leading to a device to be controlled, an imperforate movable condition responsive element subjected on one side to the pressure in said compartment, means subjecting said condition responsive element to a control force, two valves associated with the two valve seats, each valve having a head engaging one of said valve seats and a stem extending transversely to the direction of movement of the condition responsive element, the stems being spaced apart, springs arranged to urge said heads towards their seats, and an operating member on said condition responsive element having a part disposed in the gap between said valve stems and in one position of which both valves are closed, so that the movement of said part in one direction from said one position tilts the head of one valve on its seat and opens its port and movement in the opposite direction tilts the other valve head and opens its port.

GEOFFREY DEVAS EVERINGTON.

REFERENCES CITED

The following references are of record in the file of this patent:

UNITED STATES PATENTS

| Number | Name | Date |
|---|---|---|
| 1,789,388 | McMillan | Jan. 20, 1931 |
| 2,013,222 | Thomas | Sept. 3, 1935 |
| 2,202,286 | Gorrie | May 28, 1940 |
| 2,372,311 | Brown | Mar. 27, 1945 |